United States Patent [19]

Hilaris et al.

[11] Patent Number: 5,013,051
[45] Date of Patent: May 7, 1991

[54] SINGLE COMPONENT SEAL

[75] Inventors: John A. Hilaris, Elmhurst; George D. Waring, Woodridge, both of Ill.

[73] Assignee: EG&G Sealol, Inc., Cranston, R.I.

[21] Appl. No.: 227,459

[22] Filed: Aug. 2, 1988

Related U.S. Application Data

[63] Continuation of Ser. No. 811,231, Dec. 20, 1985, abandoned.

[51] Int. Cl.⁵ .............................................. F16J 15/36
[52] U.S. Cl. ...................................... 277/89; 277/88; 277/93 R
[58] Field of Search ....................... 277/88, 89; 90, 42, 277/43, 199, 93 R

[56] References Cited

U.S. PATENT DOCUMENTS

| 1,993,268 | 3/1935 | Ferguson | 277/92 X |
|---|---|---|---|
| 2,251,219 | 7/1941 | Brummer | 277/92 X |
| 2,447,663 | 8/1948 | Payne | 277/81 X |
| 2,464,988 | 3/1949 | Payne | 277/88 X |
| 2,556,133 | 6/1951 | Bright | 277/89 X |
| 2,692,787 | 10/1954 | Brummer | 277/89 X |
| 2,740,648 | 4/1956 | Amblard | 277/81 X |
| 2,769,390 | 11/1956 | Heimbuch | 277/90 X |
| 2,983,125 | 5/1961 | Peickii et al. | 277/90 X |
| 3,007,724 | 11/1961 | Amirault et al. | 277/88 X |
| 3,137,237 | 6/1964 | Zagar et al. | 277/90 X |
| 3,185,488 | 5/1965 | Christensen et al. | 277/42 |
| 3,563,556 | 2/1971 | Scott | 277/90 X |
| 3,848,880 | 11/1974 | Tanner | 297/177 X |
| 4,510,664 | 4/1985 | Lock | 29/450 |

FOREIGN PATENT DOCUMENTS

| 1199623 | 12/1959 | France | 277/90 |
|---|---|---|---|
| 832190 | 5/1981 | U.S.S.R. | 277/152 |
| 1414408 | 11/1975 | United Kingdom | 277/89 |
| 2065243 | 6/1981 | United Kingdom | 277/88 |
| 2091823 | 8/1982 | United Kingdom | 277/88 |

Primary Examiner—Allan N. Shoap
Attorney, Agent, or Firm—Finnegan, Henderson, Farabow, Garrett & Dunner

[57] ABSTRACT

A seal component which establishes a seal between a rotating shaft and a housing includes an annular face and an axially extending tubular elastomeric bellows. The geometric configuration of the bellows allows it to buckle, exert a substantially uniform axially force over a wide operating range, and be used without reinforcing members.

13 Claims, 3 Drawing Sheets

SINGLE COMPONENT SEAL

This application is a continuation of application Ser. No. 06/811,231, filed Dec. 20, 1985, now abandoned.

BACKGROUND OF THE INVENTION

1. Field of the Invention

The present invention relates to mechanical rotary seals.

II. Description of the Related Art

Compact self-contained cartridge type mechanical seals, such as the ones shown in FIGS. 1 and 2, are specifically designed for high quantity production of industrial and domestic pumps handling water, steam, oil, hydraulic fluids, refrigerants, and gases at pressures as high as 100 psi. The seal shown in FIG. 1 is known in the industry as a shaft mounted seal and presses onto the shaft of a pump, while the seal in FIG. 2 is known as a bore mounted seal and presses into the pump housing. Such seals use coil springs $10a$ and $10b$, respectively, to maintain an axial force between face seal ring $12a$ and complementary surface $14a$ in FIG. 1, and face seal ring $12b$ and complementary surface $14b$ in FIG. 2. Sealing members $16a$ and $18a$ are used to seal the face members to the shaft and housing in FIG. 1. Sealing members $16b$ and $18b$ are used to seal the facing members to the housing and shaft in FIG. 2. In such arrangements, reinforcing members $20a$, $22a$ and $24a$ are used to hold sealing member $16a$ in place in the arrangement shown in FIG. 1. Reinforcing members $20b$, $22b$ and $24b$ are used to hold the sealing member $16b$ in place in FIG. 2.

There are many drawbacks to these coil spring seal designs. The large number of component parts makes manufacture complicated. The use of a steel spring coil produces an uneven load distribution on the periphery of the carbon face member. The seal is unsuitable for acids and highly corrosive fluids because it contains metallic parts. The seal in FIG. 2 has metal-to-metal interference with the pump housing which, when installed, requires the use of an "O" ring or a very tight fit using a mastic sealing material applied during the installation.

U.S. Pat. No. 3,185,488 discloses a mechanical rotary seal having a sealing member with reinforcing members which does not require the use of a coil spring to maintain the face members in positions against each other. Although several of the drawbacks of the coil spring biassed seal are overcome by this arrangement, other drawbacks remain and new problems are created. In particular, the built-in reinforcing members constitute an expensive construction. Also, the presence of such reinforcing members makes the seal difficult to install because it binds when it is assembled to the shaft or housing due to its requirement of being slid into position as a single unit so that a tight seal can be maintained. Furthermore, such seals have a very short operating range of axial compression which is unforgiving in low tolerance design and operating situations. In addition, the axial force over the operating range varies considerably.

Accordingly, it is an object of the present invention to provide a seal which does not have a large number of component parts which makes manufacture complicated.

It is another object of the present invention to provide a biassed member which provides an even load distribution on the periphery of the carbon face seal ring.

It is a further object of the present invention to provide a seal having no metallic parts, thereby making the seal suitable for use with acids and highly corrosive fluids.

It is also an object of the present invention to provide a seal having no metal-to-metal interference with the pump housing and no need for the use of an "O" ring or mastic sealing material.

It is an additional object of the present invention to provide a seal which requires no reinforcing members to hold the sealing members in place.

It is another object of the present invention to provide a seal which can be easily assembled and installed on the shaft and housing without binding the shaft and housing during assembly.

It is a further object of the present invention to provide a seal having a long operating range of axial compression.

It is also an object of the present invention to provide a seal having a substantially constant axial force over the operating range of axial compression.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a seal component for establishing a seal between a rotating shaft and a housing comprising an annular face seal ring having front axial portion means for abutting, sealing against, and rotating relative to a complementary surface on one of the housing or the shaft; and an axially extending tubular elastomeric bellows having first end portion means for sealing against the annular face seal ring, second end portion means for sealing against the other of the housing or the shaft, and an axially intermediate portion axially extending between the first end portion means and the second end portion means, the axially intermediate portion including means for buckling the bellows around a circumferential area of the bellows, for maintaining the front axial portion of the face seal ring in sealing relationship with the complementary surface, and for maintaining the second end portion in the sealing relationship with the shaft upon axial compression of the elastomeric bellows.

It is preferable that the elastomeric bellows consists of one piece of unreinforced elastomeric material. It also is preferable that the intermediate portion has a slender radial cross section which is less than about one-half of its axial cross section, the intermediate portion diverging from the second end portion to the first end portion at an angle in the range about 10° to about 45°.

BRIEF DESCRIPTION OF THE DRAWINGS

The accompanying drawings, which are incorporated in and constitute a part of the specification, illustrate a preferred embodiment of the invention and, together with the general description given above, and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

In accordance with the present invention as used in a shaft mounted seal embodiment, there is provided a seal component for establishing a seal between a rotating shaft and a housing comprising an annular face seal ring having front axial portion means for abutting, sealing against, and rotating relative to a complementary surface on the housing; and an axially extending tubular elastomeric bellows having first end portion means for sealing against the annular face seal ring, second end portion means for sealing against the shaft, and an axially intermediate portion axially extending between the first end portion means and the second end portion means, the axially intermediate portion including means for buckling the bellows around a circumferential area of the bellows, for maintaining the front axial portion of the face seal ring in sealing relationship with a complementary surface, and for maintaining the second end portion in sealing relationship with the shaft upon axial compression of the bellows.

Figure 1:
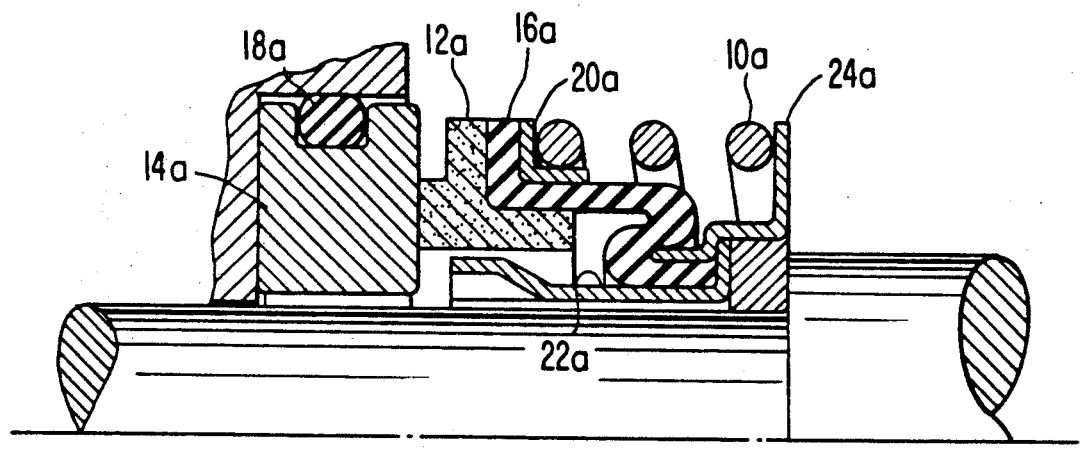
FIG. 1 is a cross section view of a conventional shaft mounted seal.
Figure 2:
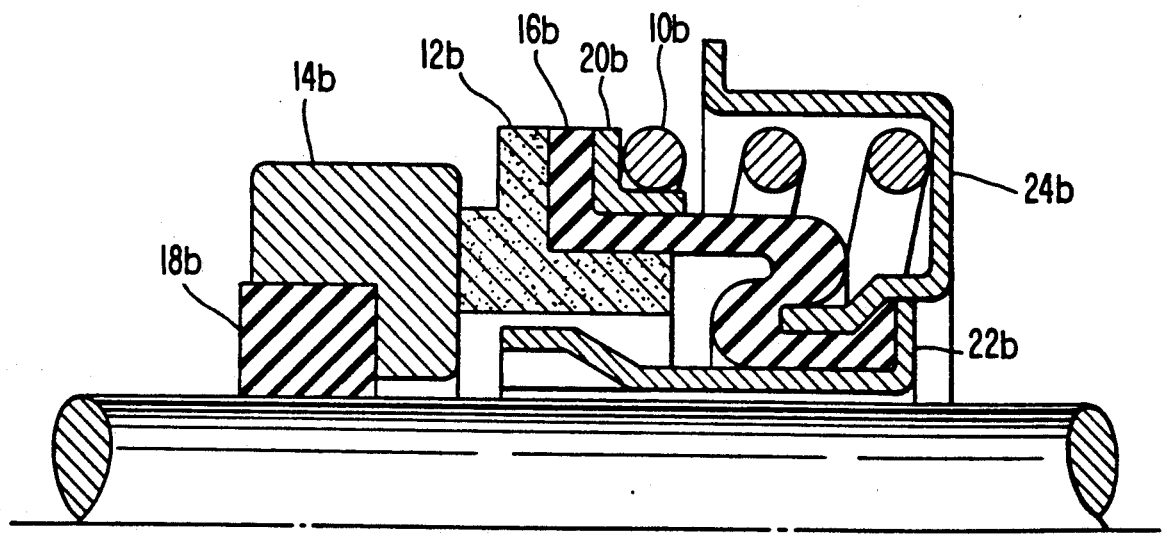
FIG. 2 is a cross section view of a conventional bore mounted seal.
Figure 3:
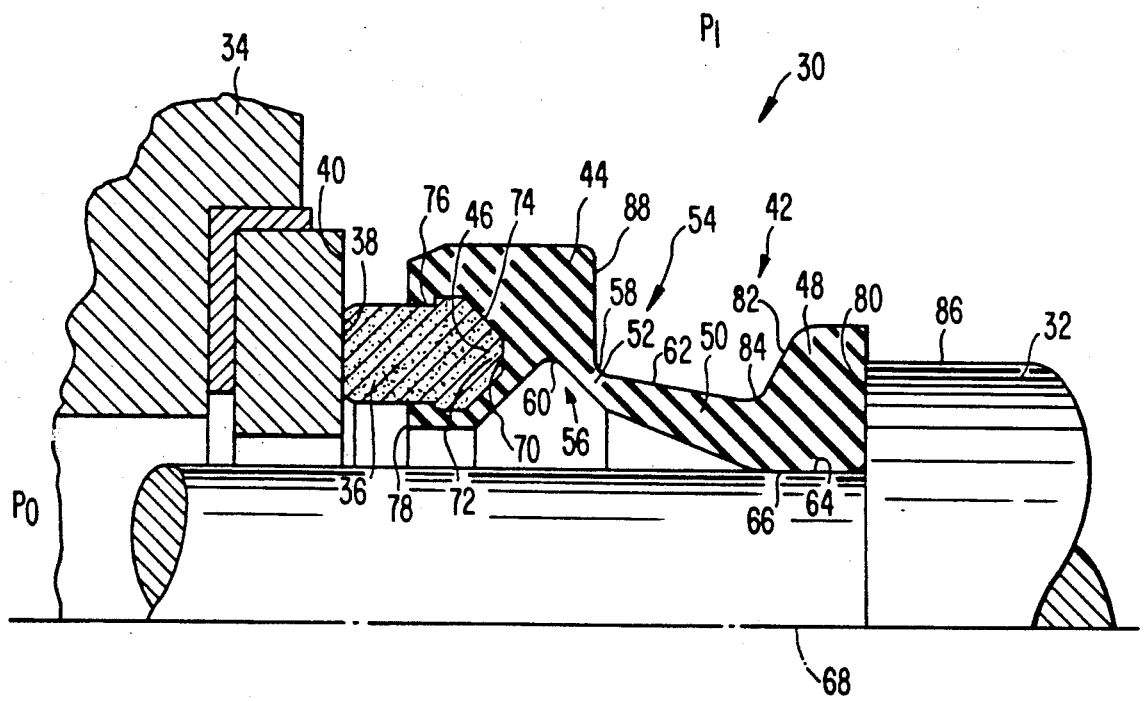
FIG. 3 is a cross section view of a shaft mounted seal in an uncompressed state incorporating the teachings of the present invention.

As shown in the shaft mounted seal embodiment of FIG. 3, seal component 30 establishes a seal between a rotating shaft 32 and a housing 34. Seal component 30 includes an annular face seal ring such as carbon face seal ring 36 having a front axial portion means such as surface 38 for abutting, sealing against, and rotating relative to a complementary surface on the housing such as housing face 40.

An axially extending tubular elastomeric bellows 42, includes a first end portion 44 which includes a block of elastomeric material that seals against the rear portion 46 of face seal ring 36. Bellows 42 also includes a second end portion 48 for sealing against the shaft 32. Bellows 42 further includes an axially intermediate portion 50 having means for buckling bellows 42 around a circumferential area, such as structurally weakened neck area 52, while maintaining the front surface 38 of face seal ring 36 in sealing relationship with complementary surface 40 and maintaining second end portion 48 in sealing relationship with shaft 32 upon axial compression of bellows 42. Bellows 42 preferably consists of one piece of elastomeric material composed of ethylene propylene, fluorocarbon, buna, neoprene or similar materials.

Face seal ring 36 and bellows 42 are each molded separately and assembled together with a snapping action to unitize the assembly. According to the present invention, bellows 42 is unreinforced and does not need to contain any metallic or plastic reinforcing rings in order to assist in locking bellows 42 on rotating shaft 32 or face seal ring 36. Therefore, first end portion 44 seals to face seal ring 36 without reinforcement and without mastic sealing material. In addition, second end portion 48 seals to shaft 32 without reinforcement.

According to the present invention, the means for buckling and maintaining includes means for buckling the intermediate portion 50 towards shaft 32 so that second end portion 48 grips shaft 32 with an increasing force as bellows 42 is axially compressed. The geometric arrangement of bellows 42 is the means which allows this to occur.

In particular, according to the present invention, the means for buckling and maintaining sealing relationship includes neck area 52, having a narrow cross-section, positioned at the junction between the intermediate portion 50 and the first end portion 44. Intermediate portion 50 has a slender radial cross section and first and second end portions 44 and 48 have comparatively wide radial cross sections relative to intermediate portion 50. The radial cross section of intermediate portion 50 is preferably less than about one-half its axial cross section. The intermediate portion 50 generally extends longitudinally in the axial direction. Neck area 52 is positioned radially outward of the junction between intermediate portion 50 and second end portion 48. Also, intermediate portion 50 diverges from second end portion 48 to first end portion 44 at an angle in the range of about 10° to 45°. Intermediate portion 50 has a radial cross section which increases in width in the direction from the first end portion 44 to the second end portion 48.

According to the present invention, the structurally weakened neck area 52 preferably includes a first V portion 54 on the radially outward side of seal component 30, and a second V portion 56 on the radially inner side of seal component 30. The convergence point or vertex 58 of the first V portion is radially inward of the convergence point or vertex 60 of the second V portion.

The geometry which provides the buckling allows bellows 42 to provide a substantially constant axial force over the operating range of the axial compression of bellows 42. In addition, the operating range of bellows 42 is greatly increased from conventional seals which would have an operating range of approximately 0.040 inches to a substantially greater operating range of about 0.140 inches. This greater operating range and the constant axial force over the operating range allows the inventive seal to be used in low tolerance situations where axial play is involved.

Figure 5:
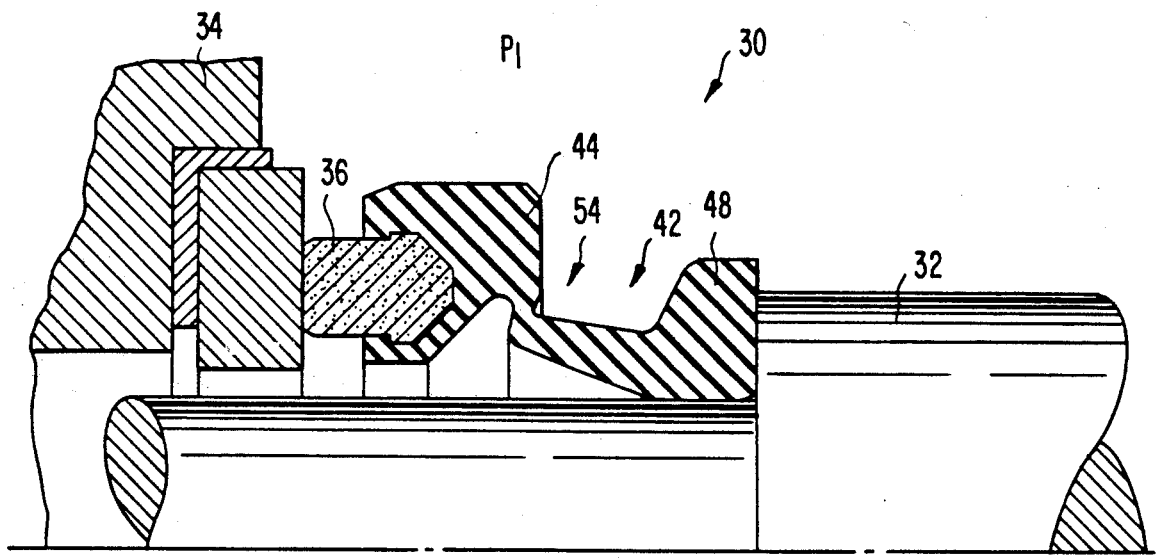
FIG. 5 is a cross section view of the shaft mounted seal shown in FIG. 3 in a compressed state within the operating range.

As shown in FIG. 5, the seal is shown in a compressed state within the operating range. The seal can be further or lesser compressed than in this position and still be within the operating range where sealing occurs and a constant axial force is present.

A force is maintained between faces 38 and 40 which is sufficiently high in order to provide a good seal and sufficiently low so as not to generate excessive heat due to friction. In addition, the absence of reinforcement rings and the buckling arrangement allow the inside diameter 64 of second end portion 48 to be sufficiently large relative to the outside diameter 66 of shaft 32 so as not to bind when seal component 30 is assembled to shaft 32. This is so even though the inside diameter of the second end portion preferably is smaller than the outside diameter of the shaft. Such ease in assembly is important and would not be possible with conventional seals using reinforcing rings because they would need to have as tight a fit during installation as during operation, a condition which is unnecessary due to the geometric arrangement of bellows 42 of the present invention.

Other geometric characteristics of the present invention aid in establishing these properties and also establish properties which allow bellows 42 to be secured to face seal ring 36 while preventing undesirable torque on face seal ring 36 due to axial compression of bellows 42 during use. The outer surface 62 of intermediate portion 50 and the convergence point 60 of the second V portion are generally aligned on the same conical surface so that a projection of surface 62 would intersect convergence point 60. In addition, the convergence point 60 of the second V portion 56 and the center 46 of the radial cross section of face seal ring 36 are positioned at the same radial distance from the longitudinal axis 68 of seal component 30.

Receptacle means such as cavity 70 is positioned in the front axial face of the first end portion 44. The rear axial portion 46 of the face seal ring 36 includes a convexly curved central cross section 72 and a forwardly and outwardly angled radially outer portion 74. This geometric arrangement allows the force of bellows 42 to flow around the portions of face seal ring 36 including convexly curved central cross section 72 and forwardly and outwardly angled radially outer portion 74 to provide a retaining force on the radially outward part of face seal ring 36.

It is preferable that the radially outer portion of cavity 70 includes a detent 76 for providing positive restraint against relative axial movement between face seal ring 36 and bellows 42. Detent 76 includes lips in bellows 42 which engage a notch in face seal ring 36. In such a fashion, the two pieces can be molded separately and assembled together by snapping them in place to unitize the assembly. Radially inner and outer portions 76 and 78 are used for more firmly securing face seal ring 36 and elastomeric bellows 42.

This inventive seal component, unlike conventional seal components, consists of only one element other than face seal ring 36, namely, bellows 42 which, as an unreinforced single component, performs the duties of many elements on conventional seals which are not required in this arrangement. In particular, four duties need to be performed by seals. They include providing axial force, rotational drive, a primary seal between relatively rotating mating faces and a secondary seal between static surfaces. The bellows of the inventive arrangement provides all of these duties except providing a primary seal.

When this seal is used, atmospheric pressure $P_0$ exists on the radially inner portion of the seal and a higher pressure $P_1$ exists on the radially outer portion of the seal due to the pressure of the sealed fluid. Second end portion 48 includes an axial sealing surface 80 for sealing against an axial portion of shaft 32 and an inner radial sealing portion 64 for sealing against the outer radial portion of the shaft. As shown in FIG. 3, this is accomplished by using a shaft 32 with a step formed to result in lesser and greater outer radii and an intermediate axial portion.

Second end portion 48 includes a second axial surface 82 having an inner radius 84 less than the outer radius 86 of the axial portion of the shaft. Since $P_1$ is greater than $P_0$, this relationship causes the axial portion 80 of second end portion 48 to be sealed against the axial portion of the shaft. That sealing force increases as the fluid pressure $P_1$ increases thereby forming an even tighter seal under higher pressures. Similarly, the first end portion 44 includes a rear axial surface 88 having a minimum outer radius less than the outer radius of face seal ring 36 so that the pressure $P_1$ will bias first end portion 44 toward housing face 40 and tend to increase this biasing force as the pressure of the sealed fluid $P_1$ increases.

In accordance with the present invention as used in a bore mounted seal embodiment, there is provided a seal component for establishing a seal between a rotating shaft and a housing comprising an annular face seal ring having front axial portion means for abutting, sealing against, and rotating relative to a complementary surface on the shaft; and an axially extending tubular elastomeric bellows having first end portion means for sealing against the annular face seal ring, second end portion means for sealing against the housing, and an axially intermediate portion axially extending between the first end portion means and the second end portion means, the axially intermediate portion including means for buckling the bellows around a circumferential area of the bellows, for maintaining the front axial portion of the face seal ring in sealing relationship with a complementary surface, and for maintaining the second end portion in sealing relationship with the housing upon axial compression of the bellows.

Figure 4:
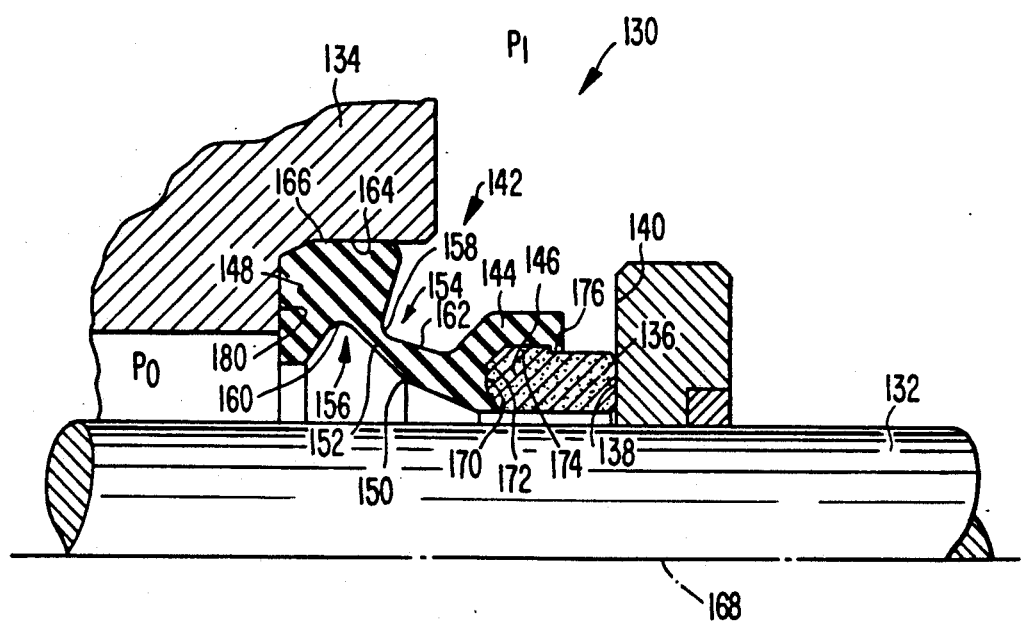
FIG. 4 is a cross section view of a bore mounted seal in an uncompressed state incorporating the teachings of the present invention.

As shown in the bore mounted seal embodiment of FIG. 4, seal component 130 establishes a seal between a rotating shaft 132 and a housing 134. Seal component 130 includes an annular face seal ring such as carbon face seal ring 136 having a front axial portion 138 for abutting, sealing against, and rotating relative to a complementary surface on the shaft such as shaft face 140.

An axially extending tubular elastomeric bellows 142, includes a first end portion 144 which includes a block of elastomeric material that seals against the rear portion 146 of face seal ring 136. Bellows 142 also includes a second end portion 148 for sealing against the housing 134. Bellows 142 further includes an axially intermediate portion 150 having means for buckling bellows 42 around a circumferential area, such as structurally weakened neck area 152, while maintaining the front surface 138 of face seal ring 136 in sealing relationship with complementary surface 140 and maintaining second end portion 148 in sealing relationship with housing 134 upon axial compression of bellows 142. Bellows 142 preferably consists of one piece of elastomeric material composed of ethylene propylene, fluorocarbon, buna, neoprene or similar materials.

Face seal ring 136 and bellows 142 are each molded separately and assembled together with a snapping action to unitize the assembly. According to the present invention, bellows 142 is unreinforced and does not need to contain any metallic or plastic reinforcing rings in order to assist in locking bellows 142 on rotating shaft 132 or face seal ring 136. Therefore, the first end portion seals to face seal ring 136 without reinforcement and without mastic sealing material. In addition, second end portion 148 seals to shaft 132 without reinforcement.

According to the present invention, the means for buckling and maintaining includes means for buckling the intermediate portion 150 toward shaft 132 so that second end portion 148 grips housing 134 with an increasing force as bellows 142 is axially compressed. The geometric arrangement of bellows 142 is the means which allows this to occur.

In particular, according to the present invention, the means for buckling and maintaining sealing relationship includes neck area 152, having a narrow cross-section, positioned at the junction between intermediate portion 150 and second end portion 148. Intermediate portion 150 has a slender radial cross-section and first and second portions 144 and 148 have comparatively wide radial cross-sections relative to intermediate portion 150. The radial cross-section of intermediate portion 150 is preferably less than about one half its axial cross-section. The intermediate portion 150 also generally extends longitudinally in the axial direction and neck area 152 is positioned radially outward of the junction between intermediate portion 150 and first end portion 144. Also, intermediate portion 150 diverges from first end portion 144 to second end portion 148 at an angle in the range of about 10° to 45°. Intermediate portion 150 has a radial cross-section which increases in width in the direction from second end portion 148 to first end portion 144.

According to the present invention, the structurally weakened neck area 152 preferably includes a first V portion 154 on the radially outward side of seal component 130, and a second V portion 156 on the radially inner side of seal component 130. The convergence point or vertex 158 of the first V portion is radially inward of the second convergence point or vertex 160 of the second V portion.

The geometry which provides the buckling allows bellows 142 to provide a substantially constant axial force over the operating range of the axial compression of bellows 142. In addition, the operating range of bellows 142 is greatly increased from conventional seals which would have an operating range of approximately 0.040 inches to substantially greater operating range of about 0.140 inches. This greater operating range and the constant axial force over the operating range allows the inventive seal to be used in low tolerance situations where axial play is involved.

Figure 6:
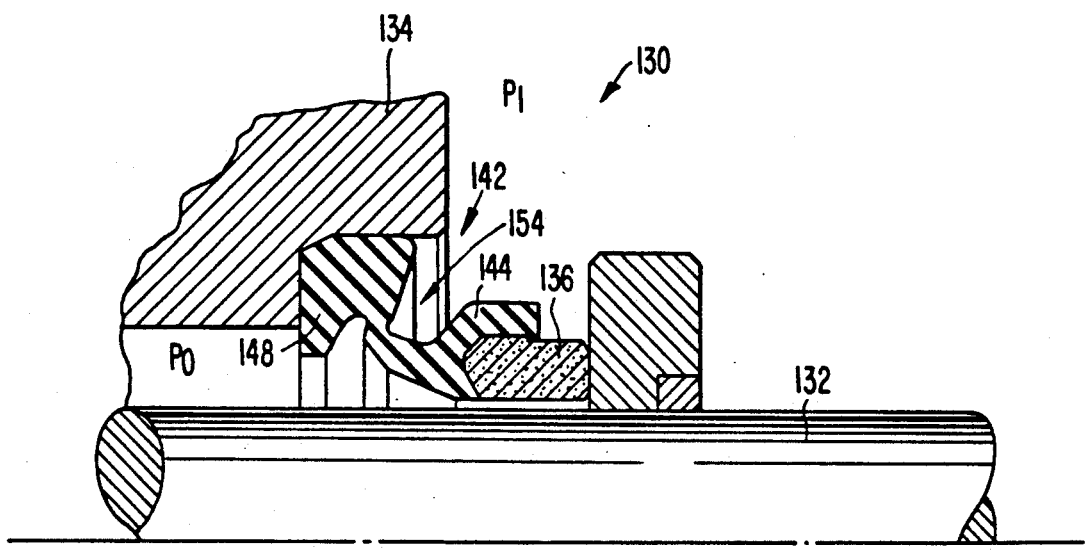
FIG. 6 is a cross section view of the bore mounted seal shown in FIG. 4 in a compressed state within the operating range.

As shown in FIG. 6, the seal is shown in a compressed state within the operating range. The seal can be further or lesser compressed than in this position and still be within the operating range where sealing occurs and a constant axial force is present.

A force is maintained between faces 138 and 140 which is sufficiently high in order to provide a good seal and sufficiently low so as not to generate excessive heat due to friction. In addition, the absence of reinforcement rings and the buckling arrangement allow the outside diameter 164 of second end portion 148 to be sufficiently small relative to the inside diameter 166 of housing 134 so as not to bind when seal component 130 is assembled to housing 134. This is so even though the outside diameter of the second end portion preferably is larger than the inside diameter of the housing. Such ease in assembly is important and would not be possible with conventional seals using reinforcing rings because they would need to have as tight a fit during installation as during operation, a condition which is unnecessary due to the geometric arrangement of bellows 142 of the present invention.

Other geometric characteristics of the present invention aid in establishing these properties and also establish properties which allow bellows 142 to be secured to face seal ring 136 while preventing undesirable torque on face seal ring 136 due to axial compression of bellows 142 during use. The outer surface 162 of intermediate portion 150 and the convergence point 160 of second V portion are generally aligned on the same conical surface so that a projection of surface 162 would intersect convergence point 160. In addition, the convergence point 160 of the second V portion 156 and the center 146 of the radial cross-section of face seal ring 136 are positioned at the same radial distance from the longitudinal axis 168 of seal component 130.

Receptacle means such as cavity 170 is positioned in the front axial face of first end portion 144. The rear axial portion 146 of face seal ring 136 includes a convexly curved central crosssection 172 and a forwardly and outwardly angled radially outer portion 174. This geometric arrangement allows the force of bellows 142 to flow around the portions of face seal ring 136 including convexly curved central cross-section 172 and forwardly and outwardly angled radially outer portion 174 to provide a retaining force on the radially outward part of face seal ring 136.

It is preferable that the radially outward portion of cavity 170 includes a detent 176 for providing positive restraint against relative axial movement between face seal ring 136 and bellows 142. Detent 176 includes lips in bellows 142 which engage a notch in face seal ring 136. In such a fashion, the two pieces can be molded separately and assembled together by snapping them in place to unitize the assembly.

This inventive seal component, unlike conventional seal components, consists of only one element other than face seal ring 136, namely, bellows 42 which, as an unreinforced single component, performs the duties of many elements on conventional seals which are not required in this arrangement. In particular, four duties need to be performed by seals. They include providing axial force, rotational drive, a primary seal between relatively rotating mating faces and a secondary seal between static surfaces. The bellows of the inventive arrangement provides all of these duties except providing a primary seal.

When this seal is used, atmospheric pressure $P_0$ exists on the radially inner portion on the seal and a higher pressure $P_1$ exists on the radially outer portion of the seal due to the pressure of the sealed fluid. Second end portion 148 includes an axial sealing surface 180 for sealing against an axial portion of the housing 134 and an outer radial sealing portion 164 for sealing against the inner radial portion of housing 134. As shown in FIG. 4, this is accomplished by using a housing 134 with a step to form axial and radial surfaces.

The outer radial surface of face seal ring 136 has an outer radius greater than the minimum radius of bellows 142 so that $P_1$ will bias first end portion 144 toward seal face 140 and tend to increase this biasing force as the pressure of the sealed fluid $P_1$ increases.

An additional feature of the inventive arrangement is that each size mold for a bellows can serve both as a shaft mounted or bore mounted seal with minor modifications in the mold. The following table illustrates that a bellows produced by a particular mold would serve as a seal for a different size shaft if used in a shaft mounted seal arrangement than the size shaft used in a bore mounted arrangement.

TABLE I

| Mold Number | Type 6 shaft diameter | Type 7 shaft diameter |
| --- | --- | --- |
| 1 | .375 | .250 |
| 2 | .500 | .375 |
| 3 | .625 | .500 |
| 4 | .750 | .625 |
| 5 | .875 | .750 |
| 6 | 1.000 | .875 |

Also, it can be seen that the inventive arrangement has a wider range of tolerance than conventional arrangements because it is easy to install, it accommodates different surface roughnesses of a shaft or housing, and it is able to accommodate shafts and housings which are made in both English and metric units from one set of molds. For instance, the following table illustrates how each mold in a series of molds can produce a seal which is usable both on a shaft calibrated in the English system and a slightly different size shaft calibrated in the metric system.

TABLE II

| Mold Number | English shaft diameter | Metric shaft diameter |
| --- | --- | --- |
| 1 | 3/8" | 10 mm |
| 2 | 1/2" | 12 mm |
| 3 | 5/8" | 15 mm 16 mm |
| 4 | 3/4" | 20 mm |
| 5 | 7/8" | 22 mm |
| 6 | 1" | 25 mm |

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicants' general inventive concept.

What is claimed is:

1. A seal component for establishing a seal between a rotating shaft and a housing comprising:
    an axially extending tubular elastomeric bellows having a first end portion, a second end portion, and an axially intermediate portion extending between and axially spacing the first end portion from the second end portion, for maintaining the first end portion in position with respect to a corresponding housing surface and the second end portion in position with respect to a corresponding shaft surface upon axial compression of the elastomeric bellows;
    an annular face seal ring positioned in one of the first end portion and the second end portion, the annular face seal ring having a front radial face for abutting, sealing against, and rotating relative to the one of the housing surface and shaft surface corresponding to the one of the first end portion and second end portion in which the annular face seal ring is positioned;
    the other of the first end portion and the second end portion in which the annular face seal ring is not positioned being provided for establishing a seal with the corresponding one of the housing surface and the shaft surface;
    the axially intermediate portion diverging from the second end portion to the first end portion at an angle in the range of about 10° to 45°, the intermediate portion including means integral to the bellows and dimensioned and configured for buckling the bellows toward the shaft at a structurally weakened neck positioned at the junction between the intermediate portion and the first end portion and thereby gripping the one of the housing surface and the shaft surface corresponding to said other end portion with increasing force as the tubular elastomeric bellows is axially compressed, the structurally weakened neck being defined by a first circumferential configuration at the radially outer side of the seal component having a V-shaped cross-section and a second circumferential configuration at the radially inner side of the seal component having a V-shaped cross-section, an area having the least thickness of the intermediate portion located between the vertex of the V-shaped first circumferential configuration and a leg of the V-shaped second circumferential configuration, the vertex of the V-shaped first circumferential configuration being radially inward of the vertex of the V-shaped second circumferential configuration, the vertex of the V-shaped second circumferential configuration being positioned substantially on a line which is contiguous to and aligned with the outer surface of the intermediate portion.

2. The seal component as claimed in claim 1 wherein the elastomeric bellows is a unitary structure composed of homogeneous elastomeric material.

3. The seal component as claimed in claim 1 wherein the one of the first and second end portion in which the annular face seal ring is positioned includes integral elastomeric contact means for contacting the annular face seal ring.

4. The seal component as claimed in claim 1 wherein the intermediate portion has a slender radial cross-section relative to the cross-section of its axial length.

5. The seal component as claimed in claim 1 wherein each one of the first and second end portion has a radial cross-section of greater width than the radial cross-section of the intermediate portion.

6. The seal component as claimed in claim 1 wherein the one of the first and second end portion in which the annular face seal ring is positioned includes receptacle means for receiving and supporting the annular face seal ring.

7. The seal component as claimed in claim 6 wherein the face seal ring and the radially outer portion of the receptacle means include detent means for providing positive restraint against relative axial movement.

8. The seal component as claimed in claim 1 wherein the inside diameter of the second end portion is dimensioned to slidably fit on the shaft when the seal component is in an uncompressed state.

9. The seal component as claimed in claim 1 wherein the outside diameter of the first end portion is dimensioned to slidably fit on the housing when the seal component is in an uncompressed state.

10. The seal component as claimed in claim 1 wherein the elastomeric bellows is operated to provide a substantially constant axial force when operated between the axial uncompressed and compressed states.

11. The seal component as claimed in claim 1 wherein the intermediate portion has a radially extending thickness less than about one-half of the axially extending length of the intermediate portion.

12. The seal component as claimed in claim 1 wherein the radial thickness of the intermediate portion decreases the further the intermediate portion extends from the second end portion in the direction of the structurally weakened neck.

13. The seal component as claimed in claim 1 wherein the diameter of the intermediate portion increases the further the intermediate portion extends from the second end portion in the direction of the structurally weakened neck.

* * * * *